United States Patent Office 3,326,843
Patented June 20, 1967

3,326,843
PHENOL FORMALDEHYDE RESINS AND CURED FRICTION ELEMENTS THEREFROM
George Barnett, Olton Solihull, and Kenneth D. Drakeley, Birmingham, England, assignors to Bakelite Xylonite Limited, a corporation of Great Britain
No Drawing. Filed Feb. 7, 1966, Ser. No. 525,314
16 Claims. (Cl. 260—38)

This is a continuation-in-part of application Ser. No. 405,856 filed Oct. 22, 1964, and now abandoned.

The invention relates to phenolic resin compositions comprising phenol formaldehyde resins and certain salts which are capable of hardening the phenol formaldehyde resins, and to the use of such compositions in the preparation of friction elements.

Synthetic resinous moulding compositions based on both phenol formaldehyde novolaks and on resoles are well known. They have been used for high pressure moulding of general purpose mouldings and for specialised applications such as the moulding of friction elements for brake linings.

Compositions comprising phenol formaldehyde novolaks will not harden without there being additionally present a formaldehyde donor such as hexamethylene tetramine. Such compositions possess the disadvantage that they possess only limited heat resistance. This is exemplified by the fact that friction elements moulded from them show a deterioration in friction and significant wear when subjected to high temperatures, e.g., if they are run hot at temperatures at 300° C. or more.

It is an object of the present invention to provide synthetic resinous moulding compositions which possess good heat resistance.

According to the present invention there is provided a hardenable composition comprising a phenol formaldehyde novolak resin and in admixture therewith a hardening amout of the salt of a least one oxyacid of boron, or phosphorus and a formaldehyde donor such as hexamethylene tetramine or methylene-aniline. Preferably the acids are phosphoric acid, or boric acid, and the invention will be particularly described by reference to those acids.

The hardenable compositions in accordance with this invention comprising a salt such as that formed by reaction between a formaldehyde donor and phosphoric or boric acid evolve little volatile material on curing; this feature reduces or substantially eliminates the tendency during processing for voids to be formed in a moulded article such as brake lining or other friction material. Whereas brake lining formed in the conventional manner using a phenol formaldehyde novolak resin and hexamine to bind asbestos and filler deteriorate if the linings are run at a temperature of 300° C., brake linings formed from the compositions of the invention possess greater heat stability and show little fade up to temperatures of about 450° C. or more.

In carrying out the present invention employing phenol formaldehyde resins which may, with advantage be used in the manufacture of brake linings and the like, for example, resins which are formed from a reaction mixture of phenol and formaldehyde in amounts of the order of 1.06:0.74, the salt may be incorporated into the resin in amounts of from 10 to 350 parts by weight per 100 of resin, or even higher. Within this range the amount may be chosen according to the use to which the composition is to be put. When the salt is added primarily to harden the resin, an amount of from 12 to 35 parts by weight per 100 parts resin is preferred. When the composition is to be used in the manufacture of friction elements, such as brake linings, much higher proportions are preferred, for example, from 100 to 300 parts by weight per 100 parts resin. It is particularly preferable for the salt to be present in an amount of from 175 to 250 parts by weight per 100 parts resin.

The lower limit of the amount of salt that may be used is dependent to a certain extent on the composition of the novolak. For example, for a novolak formed from a reaction mixture of phenol and formaldehyde present in in a molar ratio of 1.06:0.74, the lower limit for the salt concentration is about 12 parts by weight per 100 parts resin, and for a novolak formed from phenol and formaldehyde present in a molar ratio of 1.06:0.92, as little as 6 parts of the salts per 100 parts resin may be used.

Phenol formaldehyde novolak resins other than those formed from hydroxybenzene may be used—for example, cresole or xylenol resins, or resins formed from cashew nutshell liquid. Phenol formaldehyde resoles may also be employed as constituents of compositions according to the invention.

A mixture of the salts of the formaldehyde donor and boric, or phosphoric acids may also be used. The invention also includes friction materials, such as brake linings or the pads of disc brakes when made from the compositions according to the invention.

According to this aspect of the invention there is provided a friction element formed by curing a mixture comprising from 15 to 30% by weight of a hardenable composition in accordance with the invention, and from 70 to 85% by weight of a filler. The filler preferably comprises asbestos fibre present in an amount of at least 30% by weight on the weight of the element, and may also contain other fillers such as barytes, magnesia, brass, zinc or rotten stone. The relative proportion of asbestos to resin is normally determined by the facility with which the resin wets out the asbestos.

The preparation of the methylene-aniline salts by first preparing the methylene-aniline and thereafter forming the salt with the acid is difficult to achieve, as methylene-aniline is difficult to prepare as a low molecular weight soluble derivative. Accordingly, the invention also provides a process for the preparation of the methylene-aniline salt of an oxyacid of boron or phosphorus, which process comprises preparing the aniline salt of the oxyacid and thereafter reacting the aniline salt with formaldehyde.

The preparation may be carried out by dissolving the oxyacid (for example, boric acid or phosphoric acid) in a solvent such as industrial alcohol and thereafter adding the aniline in stoichiometric proportions. In cases where the aniline salt is soluble in the original solvent, as is the aniline borate, the formaldehyde may then be added directly, either in the form of an aqueous solution or in a solid form, such as paraformaldehyde. In cases where the aniline salt is not soluble in the original solvent, as is the case with aniline phosphate, the methylene-aniline salt may be formed by adding the aniline salt to a solution of formaldehyde, for example an aqueous alcoholic solution.

The following specific description further illustrates the invention; parts are parts by weight as are percentages.

EXAMPLE 1

Preparation of a salt of boric acid and hexamethylene tetramine (hexamine).

|  | G. |
|---|---|
| Hexamine (1 mole) | 140 |
| Ortho boric acid (2 moles) | 124 |
| Water | 350 |

The reactants were charged to a vessel fitted with a reflux condenser and stirrer. The charge was heated to effect solution and the pH adjusted to 6.0 by the addition of dilute sulfuric acid. The charge was then held under reflux until a clear solution was obtained. This was then cooled to 20° C. The hexamine salt precipitated and was separated by filtration and dried in an air oven at 80°

EXAMPLE 5

This example illustrates further hardenable compositions utilising a novolak such as described in Example 3.

| Example No. | 5A | 5B | 5C | 5D | 5E | 5F | 5G | 5H | 5J | 5K | 5L | 5M | 5N |
|---|---|---|---|---|---|---|---|---|---|---|---|---|---|
| Novolak | 100 | 100 | 100 | 100 | 100 | 100 | 100 | 100 | 100 | 100 | 100 | 100 | 100 |
| Hexamethylene tetramine borate | 13 | 30 | | | 50 | 100 | 200 | 300 | | | | | 500 |
| Hexamethylene tetramine phosphate | | | 30 | | | | | | 50 | 100 | 200 | 300 | |
| Hexamethylene tetramine | | | | 6 | | | | | | | | | |

C. It had a melting point of 240 to 242° C. (with decomposition).

EXAMPLE 2

Preparation of a salt of phosphoric acid and hexamethylene tetramine.

|  | G. |
|---|---|
| Hexamine (1 mole) | 140 |
| Syrupy (85%) ortho phosphoric acid | 133 |
| Industrial Methylated spirit (IMS) | 1200 |

The hexamine was dissolved in the industrial alcohol by stirring and heating to 40° C. The phosphoric acid was added slowly to the solution while stirring, the hexamine salt being precipitated. Both the precipitate and liquor were transferred to a tray and the slurry was evaporated to dryness in a vacuum oven at 80° C.

EXAMPLE 3

Preparation of a novolak resin.

One hundred parts by weight of phenol were reacted with 60 parts by weight of 37% w./w. formaline under reflux in the presence of sulfuric acid as a catalyst. When the formaldehyde content of the mixture had fallen to about 1% the resin was dehydrated by heating it to 160° C. Residual volatile material was then removed by steam distillation at 160° C. The cooled product was a brittle grindable resin.

EXAMPLE 4

This example illustrates a hardenable composition in accordance with the invention.

The composition was prepared by blending a hardener as prepared in Examples 1 and 2 with a phenolic novolak such as was prepared in Example 3. This may be effected by grinding the novolak and the salt in proportions:

|  | Parts |
|---|---|
| Phenolic novolak | 100 |
| Salt of hexamethylene tetramine, as hardener | 30 |

This phenolic resin composition may be used in conventional moulding techniques to provide moulded articles having a rapid curing rate and good heat resistant properties. They may be used with particular advantage in the production of friction materials such as is described in the following example.

The additive and the novolak are ground together. The hexamine content of Example 5 is approximately the same as that of Example 5A. Example 5D is included for the comparative purposes described with reference to Example 6.

EXAMPLE 6

This example illustrates friction elements, such as brake linings, utilising the hardenable compositions of Example 5. The components were mixed in a dry blender and moulded at 150° C. under 1 ton per sq. in. for 10 mins. The friction blocks so formed were post cured in an oven at temperatures up to 180° C. Example 6P failed to flux in the mound and when machined it distintegrated.

| Example No. | 6A | 6B | 6C | 6D | 6E | 6F | 6G | 6H | 6J | 6K | 6L | 6M | 6N | 6P |
|---|---|---|---|---|---|---|---|---|---|---|---|---|---|---|
| Asbestos | 46 | 46 | 46 | 46 | 80 | 46 | 46 | 46 | 46 | 46 | 46 | 46 | 46 | 46 |
| Barytes | 30 | 30 | 30 | 30 | | 30 | 30 | 30 | 30 | 30 | 30 | 30 | 30 | 30 |
| Binder resin: | | | | | | | | | | | | | | |
| 5A | 24 | | | | | | | | | | | | | |
| 5B | | 24 | | | | | | | | | | | | |
| 5C | | | 24 | | | | | | | | | | | |
| 5D | | | | 24 | | | | | | | | | | |
| 5E | | | | | 24 | | | | | | | | | |
| 5F | | | | | | 24 | | | | | | | | |
| 5G | | | | | | | 24 | | | | | | | |
| 5H | | | | | | | | 24 | | | | | | |
| 5J | | | | | | | | | 24 | | | | | |
| 5K | | | | | | | | | | 24 | | | | |
| 5L | | | | | | | | | | | 24 | | | |
| 5M | | | | | | | | | | | | 24 | | |
| 5N | | | | | | | | | | | | | 24 | |

The friction blocks prepared in the above manner were tested in a friction machine by intermittent application to a metal disc running at constant speed. After bedding the blocks in at 100° C. followed by a short period at 300° C. the variation in coefficient of friction was noted for temperatures rising from 100° C. to 410° C. and then for temperatures falling from 400° C. to 100° C. The following results were obtained:

| | $\mu$ Values at— | | | | |
|---|---|---|---|---|---|
| | 100° C. | 250° C. | 410° C. | 250° C. | 100° C. |
| | Coefficient of friction ($\mu$) | | | | |
| Example No: | | | | | |
| 6A | 0.29 | 0.36 | 0.47 | 0.42 | 0.42 |
| 6B | 0.39 | 0.39 | 0.59 | 0.50 | 0.47 |
| 6C | 0.42 | 0.47 | 0.47 | 0.42 | 0.50 |
| 6D | 0.16 | 0.23 | 0.42 | 0.42 | 0.39 |
| 6E | 0.34 | 0.30 | 0.41 | 0.53 | 0.26 |
| 6F | 0.52 | 0.52 | 0.42 | 0.47 | 0.47 |
| 6G | 0.59 | 0.55 | 0.52 | 0.52 | 0.59 |
| 6H | 0.52 | 0.50 | 0.52 | 0.52 | 0.47 |
| 6J | 0.52 | 0.59 | 0.68 | 0.63 | 0.59 |
| 6K | 0.42 | 0.42 | 0.59 | 0.53 | 0.47 |
| 6L | 0.47 | 0.44 | 0.59 | 0.55 | 0.47 |
| 6M | 0.45 | 0.46 | 0.53 | 0.53 | 0.53 |
| 6N | 0.59 | 0.60 | 0.68 | 0.72 | 0.68 |

All the examples using hexamine salts had a higher and more stable coefficient of friction than that using hexamine. The coefficient of friction was found to increase with increasing amounts of hexamine salt. The products obtained from the phenolic novolak-hexamethylene tetramine blend (6D) showed more fade and poorer recovery in the tests carried out in the friction machine than was observed with the compositions of the invention. It was noticed that the moulded articles contained voids while those obtained from compositions comprising salts of hexamethylene tetramine were free from voids.

The wear of the products of Examples 6A to H and J to K using the hexamine salts was not significantly greater than that of the compound using hexamine, excepting Example 6E (of low resin content and containing no barytes) and Example 6N (high phosphate).

Mouldings of Examples 6H and 6M were immersed in water for 48 hours, dried and re-examined on the friction machine. The performance of each was almost identical to that observed prior to immersion.

EXAMPLE 7

*Preparation of methylene-aniline borate*

|   | G. |
|---|---|
| Ortho-boric acid (1 mole) | 62 |
| Industrial alcohol | 400 |
| Aniline (1 mole) | 93 |
| 37% Formalin (1.23 mol) | 100 |

The boric acid was dissolved in the alcohol by heating, and the solution then cooled to 20° C. The aniline was added with stirring, followed by the formalin. The insoluble derivative was filtered off and vacuum dried at 20° C. The yield was 139 g.

EXAMPLE 8

*Preparation of methylene-aniline phosphate*

|   | G. |
|---|---|
| o-Phosphoric acid (85% 1 mol) | 115 |
| Water | 250 |
| Aniline (2 mol) | 186 |
| Industrial alcohol | 350 |
| 37% Formalin (2.46 mol) | 200 |

The aniline was added to the phosphoric acid diluted with water. The slurry of the phosphate salt formed was added to a mixture of the formalin and alcohol to give a clear solution, which on standing 15 minutes deposited an insoluble product. This was filtered off and dried in air at 20° C. The yield was 200 g.

EXAMPLE 9

This example illustrates hardenable compositions in accordance with the invention. The novolak referred to is that prepared by the method of Example 3, and the below-mentioned compositions were prepared by grinding the resin and the sale together in the following proportions:

| Composition Ref | 9A | 9B | 9C | 9D | 9E | 9F | 9G |
|---|---|---|---|---|---|---|---|
| Novolak | 100 | 100 | 100 | 100 | 100 | 100 | 100 |
| Methylene Aniline Borate | 50 | 100 | 200 | | | | |
| Methylene Aniline Phosphate | | | | 30 | 100 | 200 | |
| Hexamethylene Tetramine | | | | | | | 6 |

The additive and novolak are ground together. The available formaldehyde content of Composition 9G is approximately the same as that of 9D. Composition 9G is included for the comparative purpose described with reference to Example 10.

EXAMPLE 10

This example illustrates friction elements utilising the hardenable compositions of Example 9.

The below-mentioned components were mixed in a dry blender and moulded at 150° C. under pressure of 1 ton per sq. in. for 10 minutes. The friction elements so formed were post cured in an oven up to 180° C.

| Element No. | 10A | 10B | 10C | 10D | 10E | 10F | 10G [1] |
|---|---|---|---|---|---|---|---|
| Asbestos fibre | 46 | 46 | 46 | 46 | 46 | 46 | 46 |
| Barytes | 30 | 30 | 30 | 30 | 30 | 30 | 30 |
| Hardenable Composition: | | | | | | | |
| 4A | 24 | | | | | | |
| 4B | | 24 | | | | | |
| 4C | | | 24 | | | | |
| 4D | | | | 24 | | | |
| 4E | | | | | 24 | | |
| 4F | | | | | | 24 | |
| 4G | | | | | | | 24 |

[1] Control.

The friction elements were tested in a friction machine by intermittent application to a metal disc running at constant speed. After conditioning the friction blocks at 100° C. and then at 300° C. by repeated application on the machine the variation in coefficient of friction ($\mu$) was noted for temperatures rising from 100° C. to 410° C. and then for temperatures falling from 400° C. to 100° C.

The following observations were made:

|   | 10A | 10B | 10C | 10D | 10E | 10F | 10G [1] |
|---|---|---|---|---|---|---|---|
| $\mu$ values at ° C.: | | | | | | | |
| 100 | 0.18 | 0.15 | 0.12 | 0.17 | 0.14 | 0.17 | 0.16 |
| 250 | 0.16 | 0.14 | 0.16 | 0.26 | 0.23 | 0.23 | 0.23 |
| 410 | 0.23 | 0.09 | 0.11 | 0.19 | 0.18 | 0.12 | 0.42 |
| 250 | 0.27 | 0.11 | 0.17 | 0.22 | 0.24 | 0.22 | 0.42 |
| 100 | 0.24 | 0.15 | 0.12 | 0.20 | 0.17 | 0.16 | 0.39 |
| Wear (mg.) | 202 | 59 | 113 | 113 | 106 | 107 | 148 |

[1] Control.

The compositions in accordance with the invention showed a smaller variation in coefficient of friction than the control.

Although the above examples have been described with reference to the use of salts of boric and phosphoric acid only, it is to be understood that the salt of other oxyacids of boron or phosphorus may be used in place of these two acids; for example, orthophosphorous acid or metaboric acids may be conveniently employed. Metaphosphoric acids or metaphosphorous acid may also be used.

We claim:
1. A hardenable composition comprising a major portion of a mixture of a phenol formaldehyde novolak resin and in admixture therewith from 50 to 350 parts by weight per 100 parts of resin at least one salt of a formaldehyde donor selected from the group consisting a hexamethylene tetramine and methylene-aniline, and an acid selected from the group consisting of the oxyacids of boron, and the oxyacids of phosphorus, said salt being present in an amount sufficient to harden the composition.

2. A hardenable composition comprising a major portion of a mixture of a phenol formaldehyde novolak resin and in admixture therewith at least one salt of a formaldehyde donor selected from the group consisting of hexamethylene tetramine and methylene-aniline, and an acid selected from the group consisting of boric acid, and phosphoric acid with the proviso that when the salt comprises hexamethylene tetramine it is present in an amount of from 10 to 50 parts and when the salt comprises methylene-aniline it is present in an amount of from 30 to 50 parts, the parts being by weight per 100 parts of resin.

3. A composition as claimed in claim 1 wherein the salt is present in an amount of from 100 to 300 parts by weight per 100 parts of resin.

4. A composition as claimed in claim 1 wherein when the salt comprises hexamethylene tetramine it is present in an amount of from 175 to 250 parts and when the salt comprises methylene-aniline it is present in an amount of from 100 to 200 parts, the parts being by weight per 100 parts of resin.

5. A composition as claimed in claim 1 wherein the formaldehyde donor is hexamethylene tetramine.

6. A composition as claimed in claim 1 wherein the formaldehyde donor is methylene-aniline.

7. A friction element formed by curing a mixture comprising (a) from 15 to 30% by weight of hardenable composition comprising a phenol formaldehyde novolak resin and in admixture therewith from 50 to 350 parts by weight per 100 parts of resin at least one salt of a formaldehyde donor selected from the group consisting of hexamethylene tetramine and methylene-aniline, and an acid selected from the group consisting of the oxyacids of boron, and the oxyacids of phosphorus, and (b) from 70 to 85% by weight of a filler.

8. A friction element as claimed in claim 7 wherein the filler comprises asbestos fibre present in an amount of at least 30% by weight on the weight of the element.

9. A friction element as claimed in claim 8 which further comprises barytes.

10. A friction element formed by curing a mixture comprising (a) from 15 to 30% by weight of a hardenable composition comprising a phenol formaldehyde novolak resin and in admixture therewith at least one salt of a formaldehyde donor selected from the group consisting of hexamethylene tetramine and methylene-aniline, and an acid selected from the group consisting of boric acid, and phosphoric acid, said salt being present in an amount of from 10 to 50 parts by weight per 100 parts of resin, and (b) from 70 to 85% by weight of a filler comprising asbestos fibre which is present in an amount of at least 30% by weight on the weight of the element.

11. A friction element formed by curing a mixture comprising (a) from 15 to 30% by weight of a hardenable composition comprising a phenol formaldehyde novolak resin and in admixture therewith at least one salt of a formaldehyde donor selected from the group consisting of hexamethylene tetramine and methylene-aniline, and an acid selected from the group consisting of the oxyacids of boric, and the oxyacids of phosphoric acid, said salt being present in an amount of from 50 to 350 parts by weight per 100 parts of resin, and (b) from 70 to 85% by weight of a filler comprising asbestos fibre which is present in an amount of at least 30% by weight on the weight of the element.

12. A friction element formed by curing a mixture comprising (a) from 15 to 30% by weight of a hardenable composition comprising a phenol formaldehyde novolak resin and in admixture therewith at least one salt of a formaldehyde donor selected from the group consisting of hexamethylene tetramine and methylene-aniline, and an acid selected from the group consisting of boric acid, and phosphoric acid, said salt being present in an amount of from 50 to 350 parts by weight per 100 parts of resin, and (b) from 70 to 85% by weight of a filler comprising asbestos fibre which is present in an amount of at least 30% by weight on the weight of the element.

13. A friction element as claimed in claim 12 wherein the salt is present in an amount of from 100 to 300 parts by weight per 100 parts of resin.

14. A friction element as claimed in claim 12 with the proviso that when the salt comprises hexamethylene tetramine it is present in an amount of from 175 to 200 parts and when the salt comprises methylene-aniline it is present in an amount of from 100 to 200 parts, the parts being by weight per 100 parts of resin.

15. A brake lining element which comprises a friction element as claimed in claim 7.

16. A brake lining element which comprises a friction element as claimed in claim 12.

References Cited
UNITED STATES PATENTS

| | | | |
|---|---|---|---|
| 2,606,888 | 8/1952 | Williams et al. | 260—59 |
| 2,607,759 | 8/1952 | Yourtee | 260—248.5 |
| 2,894,931 | 7/1959 | Somerville et al. | 260—59 |
| 3,106,547 | 10/1963 | McTaggart et al. | 260—59 |

MORRIS LIEBMAN, *Primary Examiner.*

L. T. JACOBS, *Assistant Examiner.*